(12) United States Patent
McConnell et al.

(10) Patent No.: US 9,285,793 B2
(45) Date of Patent: Mar. 15, 2016

(54) DATA PROCESSING UNIT INCLUDING A SCALAR PROCESSING UNIT AND A HETEROGENEOUS PROCESSOR UNIT

(75) Inventors: Ray McConnell, Bristol (GB); Paul Winser, Bristol (GB)

(73) Assignee: BLUEWIRELESS TECHNOLOGY LIMITED, Bristol (GB)

( * ) Notice: Subject to any disclaimer, the term of this patent is extended or adjusted under 35 U.S.C. 154(b) by 408 days.

(21) Appl. No.: 13/880,473

(22) PCT Filed: Oct. 20, 2011

(86) PCT No.: PCT/GB2011/052042
§ 371 (c)(1),
(2), (4) Date: Oct. 23, 2013

(87) PCT Pub. No.: WO2012/052774
PCT Pub. Date: Apr. 26, 2012

(65) Prior Publication Data
US 2013/0331954 A1    Dec. 12, 2013

(30) Foreign Application Priority Data

Oct. 21, 2010 (GB) .................. 1017741.8
Oct. 21, 2010 (GB) .................. 1017743.4
Oct. 21, 2010 (GB) .................. 1017745.9
Oct. 21, 2010 (GB) .................. 1017746.7
Oct. 21, 2010 (GB) .................. 1017751.7

(51) Int. Cl.
G05B 19/02 (2006.01)
G06T 1/20 (2006.01)
G06F 15/78 (2006.01)
G06F 15/80 (2006.01)
H04L 29/06 (2006.01)

(52) U.S. Cl.
CPC ............ *G05B 19/02* (2013.01); *G06F 15/7842* (2013.01); *G06F 15/8092* (2013.01); *G06T 1/20* (2013.01); *H04L 69/12* (2013.01); *Y02B 60/1217* (2013.01); *Y02B 60/1225* (2013.01)

(58) Field of Classification Search
None
See application file for complete search history.

(56) References Cited

U.S. PATENT DOCUMENTS

| 4,685,076 A | 8/1987 | Yoshida |
| 5,197,130 A | 3/1993 | Chen et al. |
| 5,517,666 A * | 5/1996 | Ohtani ................ G06F 15/8092 711/100 |
| 5,625,834 A * | 4/1997 | Nishikawa .......... G06F 9/30036 712/9 |

(Continued)

FOREIGN PATENT DOCUMENTS

| EP | 1 011 052 A2 | 6/2000 |
| EP | 1736851 A2 | 6/2006 |

(Continued)

OTHER PUBLICATIONS

'Twin Peaks: A Software Platform for Heterogeneous Computing on General-Purpose and Graphics Processors' by Jayanth Gummaraju et al., PACT'10, Sep. 11-15, 2010, Vienna, Austria.*

(Continued)

*Primary Examiner* — Steven Snyder
(74) *Attorney, Agent, or Firm* — Mossman Kumar & Tyler PC

(57) ABSTRACT

A data processing unit combines a scalar processor and a heterogeneous processor which includes a vector processing array. The vector processing array includes a plurality of vector processors which are operable in a single instruction multiple data configuration.

10 Claims, 10 Drawing Sheets

(56) References Cited

U.S. PATENT DOCUMENTS

| | | | | |
|---|---|---|---|---|
| 6,862,325 | B2* | 3/2005 | Gay-Bellile | H04L 1/0045 348/554 |
| 7,926,009 | B2* | 4/2011 | Mejdrich | G06F 15/8092 716/100 |
| 8,150,902 | B2* | 4/2012 | Bates | G06F 7/4833 382/255 |
| 8,169,439 | B2* | 5/2012 | Luick | G06F 9/30032 345/421 |
| 8,407,273 | B2* | 3/2013 | Bates | G06F 7/4833 382/255 |
| 8,782,376 | B2* | 7/2014 | Knowles | G06F 9/30043 712/222 |
| 2004/0054937 | A1 | 3/2004 | Williams et al. | |
| 2004/0142717 | A1 | 7/2004 | Schmidt et al. | |
| 2005/0033927 | A1 | 2/2005 | Tomita et al. | |
| 2005/0251644 | A1* | 11/2005 | Maher | G06F 9/3001 712/2 |
| 2006/0015703 | A1* | 1/2006 | Ramchandran | G06F 1/3203 712/34 |
| 2006/0176308 | A1 | 8/2006 | Karandikar et al. | |
| 2006/0271764 | A1* | 11/2006 | Nilsson | G06F 9/30014 712/34 |
| 2007/0198815 | A1 | 8/2007 | Liu et al. | |
| 2007/0198901 | A1* | 8/2007 | Ramchandran | G06F 9/30036 714/781 |
| 2007/0294511 | A1* | 12/2007 | Ramchandran | G06F 1/3203 712/34 |
| 2008/0079712 | A1* | 4/2008 | Mejdrich | G06F 15/8092 345/418 |
| 2008/0104425 | A1 | 5/2008 | Gunther et al. | |
| 2011/0131393 | A1* | 6/2011 | Ramchandran | G06F 1/3203 712/37 |
| 2011/0249744 | A1* | 10/2011 | Bailey | G06F 9/3891 375/240.16 |
| 2012/0089812 | A1* | 4/2012 | Smith | G06F 9/4843 712/21 |
| 2012/0096445 | A1* | 4/2012 | Berg | G06F 9/44547 717/140 |
| 2012/0192201 | A1* | 7/2012 | Sander | G06T 1/20 718/105 |
| 2013/0238878 | A1* | 9/2013 | Ramchandran | G06F 1/3203 712/34 |
| 2013/0331954 | A1* | 12/2013 | McConnell | G06F 15/7842 700/2 |
| 2014/0040909 | A1* | 2/2014 | Winser | G06F 15/7817 718/104 |
| 2014/0095571 | A1* | 4/2014 | Bates | G06F 7/4833 708/524 |
| 2014/0181539 | A1* | 6/2014 | Lin | G06F 1/206 713/300 |
| 2015/0143073 | A1* | 5/2015 | Winser | G06F 9/30036 712/3 |

FOREIGN PATENT DOCUMENTS

| | | |
|---|---|---|
| EP | 1 736 851 A2 | 12/2006 |
| GB | 2 136 172 A | 9/1984 |
| GB | 2484903 B | 6/2014 |
| WO | 2005013143 A2 | 2/2005 |
| WO | 2007018467 A1 | 2/2007 |
| WO | 2012052774 A2 | 4/2012 |

OTHER PUBLICATIONS

'What is Heterogeneous System Architecture (HSA)?' from Dec. 23, 2012, copyright 2012 Advanced Micro Devices, Inc.*
'Heterogeneous Computing: Challenges and Opportunities' by Ashfaq A. Khokhar et al., copyright 1993 by IEEE.*
'Scalably Scheduling Power-Heterogeneous Processors' by Anupam Gupta et al., In ICALP (1), pp. 312-323, 2010.*
'Energy-Aware Real-Time Task Scheduling for Heterogeneous Multiprocessors with Particle Swarm Optimization Algorithm' by Weizhe Zhang et al., Hindawi Publishing Corporation, 2014.*
'Heterogeneous Energy and Makespan-Constrained DAG Scheduling' by Bobby Dalton Young et al., EEHPDC'13, Jun. 17, 2013.*
International Search Report in GB1017751.7 dated Feb. 22, 2011.
International Search Report in GB1017746.7 dated Feb. 22, 2011.
International Search Report in GB1017745.9 dated Feb. 22, 2011.
International Search Report in GB1017743.4 dated Feb. 22, 2011.
International Search Report in GB1017741.8 dated Feb. 22, 2011.
International Search Report in PCT/GB2011/052042 dated Apr. 26, 2012.
International Search Report in PCTEP2012/059772 dated Dec. 21, 2012.
International Preliminary Report on Patentability in PCT/GB2011/052042 dated Apr. 23, 2013.

* cited by examiner

| | | | |
|---|---|---|---|
| VPU_DMA_SDN_IN_0 | (SoC_Addr_00, | (Buff_Addr_00, | SS00, SS01); |
| VPU_MACRO_A_0 | (Buff_Addr_00, | (Buff_Addr_01, | SS01, SS02); |
| VAU_AU0_0 | (Buff_Addr_01, | (Buff_Addr_02, | SS02, SS03); |
| VPU_MACRO_B_0 | (Buff_Addr_10, | (Buff_Addr_11, | SS11, SS12); |
| VPU_MACRO_A_1 | (Buff_Addr_02, | (Buff_Addr_03, | SS03, SS04); |
| VAU_AU1_0 | (Buff_Addr_03, | (Buff_Addr_04, | SS04, SS05); |
| VPU_DMA_SDN_OUT_0 | (Buff_Addr_04, | (SoC_Addr_01, | SS05, SS06); |
| | | | |
| VPU_DMA_SDN_IN_1 | (SoC_Addr_10, | (Buff_Addr_10, | SS10, SS11); |
| VAU_AU0_1 | (Buff_Addr_11, | (Buff_Addr_12, | SS12, SS13); |
| VPU_MACRO_B_1 | (Buff_Addr_12, | (Buff_Addr_13, | SS13, SS14); |
| VAU_AU1_1 | (Buff_Addr_13, | (Buff_Addr_14, | SS14, SS15); |
| VPU_DMA_SDN_OUT_1 | (Buff_Addr_14, | (SoC_Addr_11, | SS15, SS16); |
| | | | |
| VPU_DMA_SDN_IN_2 | (SoC_Addr_20, | (Buff_Addr_20, | SS20, SS21); |
| VPU_MACRO_C_0 | (Buff_Addr_20, | (Buff_Addr_21, | SS21, SS22); |
| VAU_AU0_2` | (Buff_Addr_21, | (Buff_Addr_22, | SS22, SS23); |
| VPU_MACRO_D_0 | (Buff_Addr_30, | (Buff_Addr_31, | SS31, SS31); |
| VPU_MACRO_C_1 | (Buff_Addr_22, | (Buff_Addr_23, | SS23, SS24); |
| VAU_AU1_2 | (Buff_Addr_23, | (Buff_Addr_24, | SS24, SS25); |
| VPU_DMA_SDN_OUT_2 | (Buff_Addr_24, | (SoC_Addr_21, | SS25, SS26); |
| | | | |
| VPU_DMA_SDN_IN_3 | (SoC_Addr_30, | (Buff_Addr_30, | SS30, SS31); |
| VAU_AU0_3 | (Buff_Addr_31, | (Buff_Addr_32, | SS32, SS33); |
| VPU_MACRO_D_1 | (Buff_Addr_32, | (Buff_Addr_33, | SS33, SS34); |
| VAU_AU1_3 | (Buff_Addr_33, | (Buff_Addr_34, | SS34, SS35); |
| VPU_DMA_SDN_OUT_3 | (Buff_Addr_34, | (SoC_Addr_31, | SS35, SS36); |

FIG. 11a

DATA PROCESSING UNIT INCLUDING A SCALAR PROCESSING UNIT AND A HETEROGENEOUS PROCESSOR UNIT

The present invention relates to data processing units, for example for use in wireless communications systems.

BACKGROUND OF THE INVENTION

A simplified wireless communications system is illustrated schematically in FIG. 1 of the accompanying drawings. A transmitter 1 communicates with a receiver 2 over an air interface 3 using radio frequency signals. In digital radio wireless communications systems, a signal to be transmitted is encoded into a stream of data samples that represent the signal. The data samples are digital values in the form of complex numbers. A simplified transmitter 1 is illustrated in FIG. 2 of the accompanying drawings, and comprises a signal input 11, a digital to analogue converter 12, a modulator 13, and an antenna 14. A digital datastream is supplied to the signal input 11, and is converted into analogue form at a baseband frequency using the digital to analogue converter 12. The resulting analogue signal is used to modulate a carrier waveform having a higher frequency than the baseband signal by the modulator 13. The modulated signal is supplied to the antenna 14 for transmission over the air interface 3.

At the receiver 2, the reverse process takes place. FIG. 3 illustrates a simplified receiver 2 which comprises an antenna 21 for receiving radio frequency signals, a demodulator 22 for demodulating those signals to baseband frequency, and an analogue to digital converter 23 which operates to convert such analogue baseband signals to a digital output datastream 24.

Since wireless communications device typically provide both transmission and reception functions, and that, generally, transmission and reception occur at different times, the same digital processing resources may be reused for both purposes.

In a packet-based system, the datastream is divided into 'Data Packets', each of which contains up to 100's of kilobytes of data. Each data packet generally comprises:
1. A Preamble, used by the receiver to synchronize its decoding operation to the incoming signal.
2. A Header, which contains information about the packet such as its length and coding style.
3. The Payload, which is the actual data to be transferred.
4. A Checksum, which is computed from the entirety of the data and allows the receiver to verify that all data bits have been correctly received.

Each of these data packet sections must be processed and decoded in order to provide the original datastream to the receiver. FIG. 4 illustrates that a packet processor 5 is provided in order to process a received datastream 24 into a decoded output datastream 58.

The different types of processing required by these sections of the packet and the complexity of the coding algorithms suggest that a software-based processing system is to be preferred, in order to reduce the complexity of the hardware. However, a pure software approach is difficult since each packet comprises a continuous stream of samples with no time gaps in between. As such, a pipelined hardware implementation may be preferred.

For multi-gigabit wireless communications, the baseband sample rate required is typically in the range of 1 GHz to over 5 GHz. This presents a problem when implementing the baseband processing in a digital device, since this sample rate is comparable to or higher than the clock rate of the processing circuits that are generally available. The number of processing cycles available per sample can then fall to a very low level, sometimes less than unity. Existing solutions to this problem have drawbacks as follows:
1. Run the baseband processing circuitry at high speed, equal to or greater than the sample rate: Operating CMOS circuits at GHz frequencies consumes excessive amounts of power, more than is acceptable in small, low-power, battery-operated devices. The design of such high frequency processing circuits is also very labour-intensive.
2. Decompose the processing into a large number of stages and implement a pipeline of hardware blocks, each of which perform only one section of the processing: Moving all the data through a large number of hardware units uses considerable power in the movement, in addition to the power consumed in the actual processing itself. In addition, the functions of the stages are quite specific and so flexibility in the processing algorithms is lost.

Existing solutions make use of a combination of (1) and (2) above to achieve the required processing performance.

An alternative approach is one of parallel processing; that is to split the stream of samples into a number of slower streams which are processed by an array of identical processor units, each operating at a clock frequency low enough to ease their design effort and avoid excessive power consumption. However, this approach also has drawbacks. If too many processors are used, the hardware overhead of instruction fetch and issue becomes undesirably large, and, therefore, inefficient. If processors are arranged—together into a Single Instruction Multiple data (SIMD) arrangement, then the latency of waiting for them to fill with data can exceed the upper limit for latency, as specified in the protocol standard being implemented.

An architecture with multiple processors communicating via shared memory can have the problem of contention for a shared memory resource. This is a particular disadvantage in a system that needs to process a continual stream of data and cannot tolerate delays in processing.

SUMMARY OF THE INVENTION

According to one aspect of the present invention, there is provided a data processing unit for a communications system, the unit comprising a scalar processor device, and a heterogeneous processor device connected to receive first instruction information from the scalar processor, and to receive incoming data items, and operable to process incoming data items in accordance with received first instruction information, wherein the heterogeneous processor device comprises a heterogeneous controller unit connected to receive instruction information from the scalar processor, and operable to output second instruction information, an instruction sequencer connected to receive instruction information from the heterogeneous controller unit, and operable to output a sequence of instructions, and a plurality of heterogeneous function units, including a vector processor array including a plurality of vector processor elements operable to process received data items in accordance with instructions received from the instruction sequencer a low-density parity code (LDPC) accelerator unit connected to receive data items from the vector processor array, and operable, under control of the heterogeneous controller unit, to process such received data items and to transmit processed data items to the vector processor array, and a fast Fourier transform (FFT) accelerator unit connected to receive data items from the vector processor array, and operable, under control of the heterogeneous controller unit, to process such received data items and to transmit processed data items to the vector processor array.

Each accelerator unit may have partitioned data memory associated therewith, and be operable in accordance with a common instruction set.

Each vector processor may include a storage unit, and the data processing unit may further comprise a data distribution unit operable to distribute data items to such storage units of the vector processors.

In one example, the vector processors and the accelerator units have respective data storage elements associated therewith, and the data storage elements are addressable using a common addressing scheme. The common addressing scheme may also be common to storage devices external to the data processing unit.

The second instruction information may represent very long instruction words (VLIWs).

BRIEF DESCRIPTION OF THE DRAWINGS

FIGS. 11a and 11b illustrate data processing according to another aspect of the present invention, performed by the processing unit of FIG. 7 to 10.

DETAILED DESCRIPTION OF THE PREFERRED EMBODIMENTS

Figure 1:
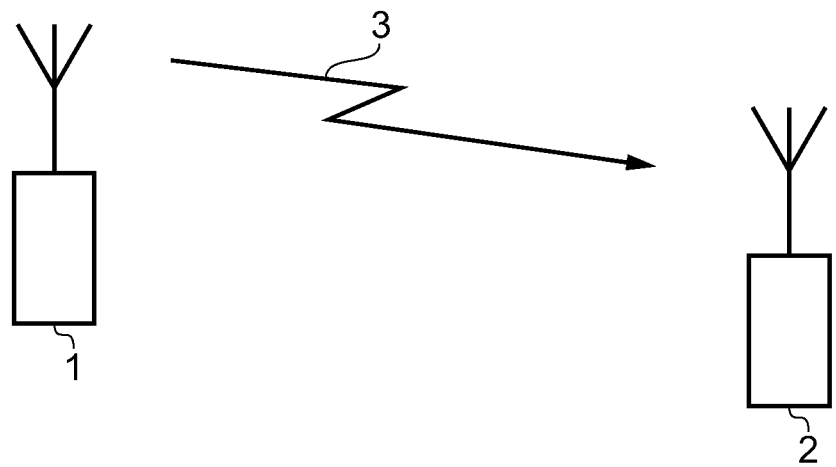
FIG. 1 is a simplified schematic view of a wireless communications system.
Figure 2:
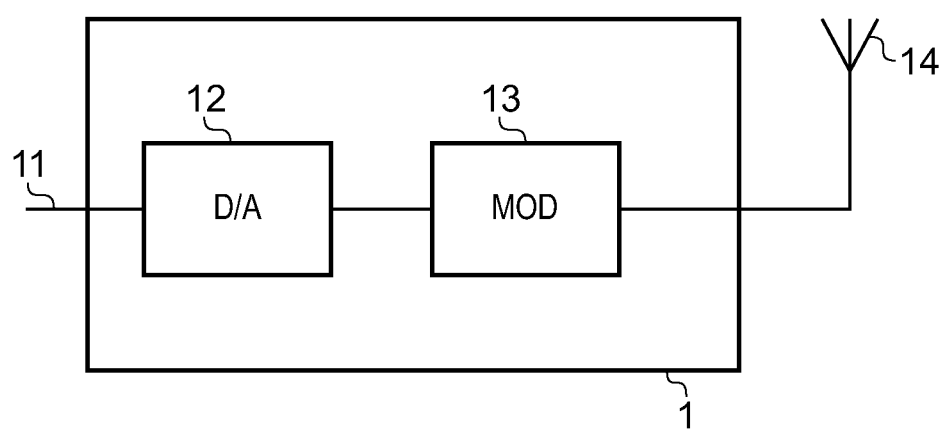
FIG. 2 is a simplified schematic view of a transmitter of the system of FIG. 1.
Figure 3:
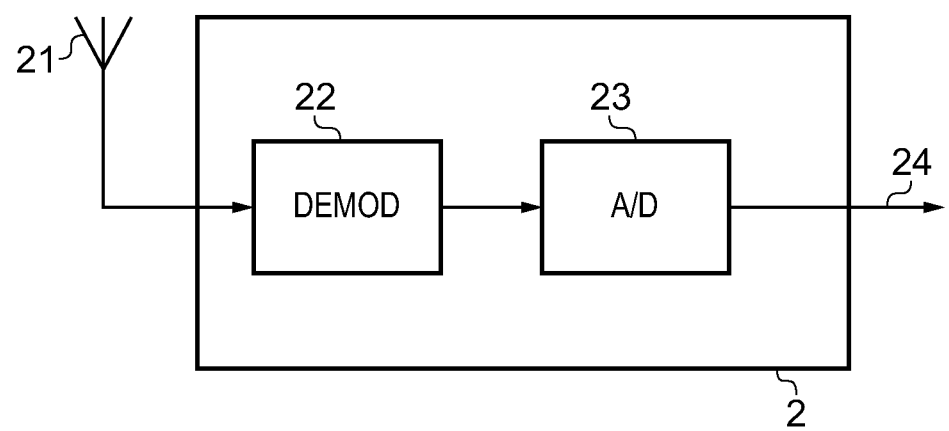
FIG. 3 is a simplified schematic view of a receiver of the system of FIG. 1.
Figure 4:
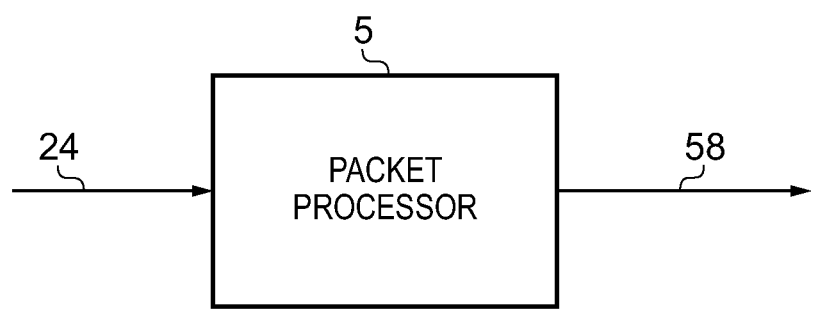
FIG. 4 illustrates a data processor.
Figure 5:
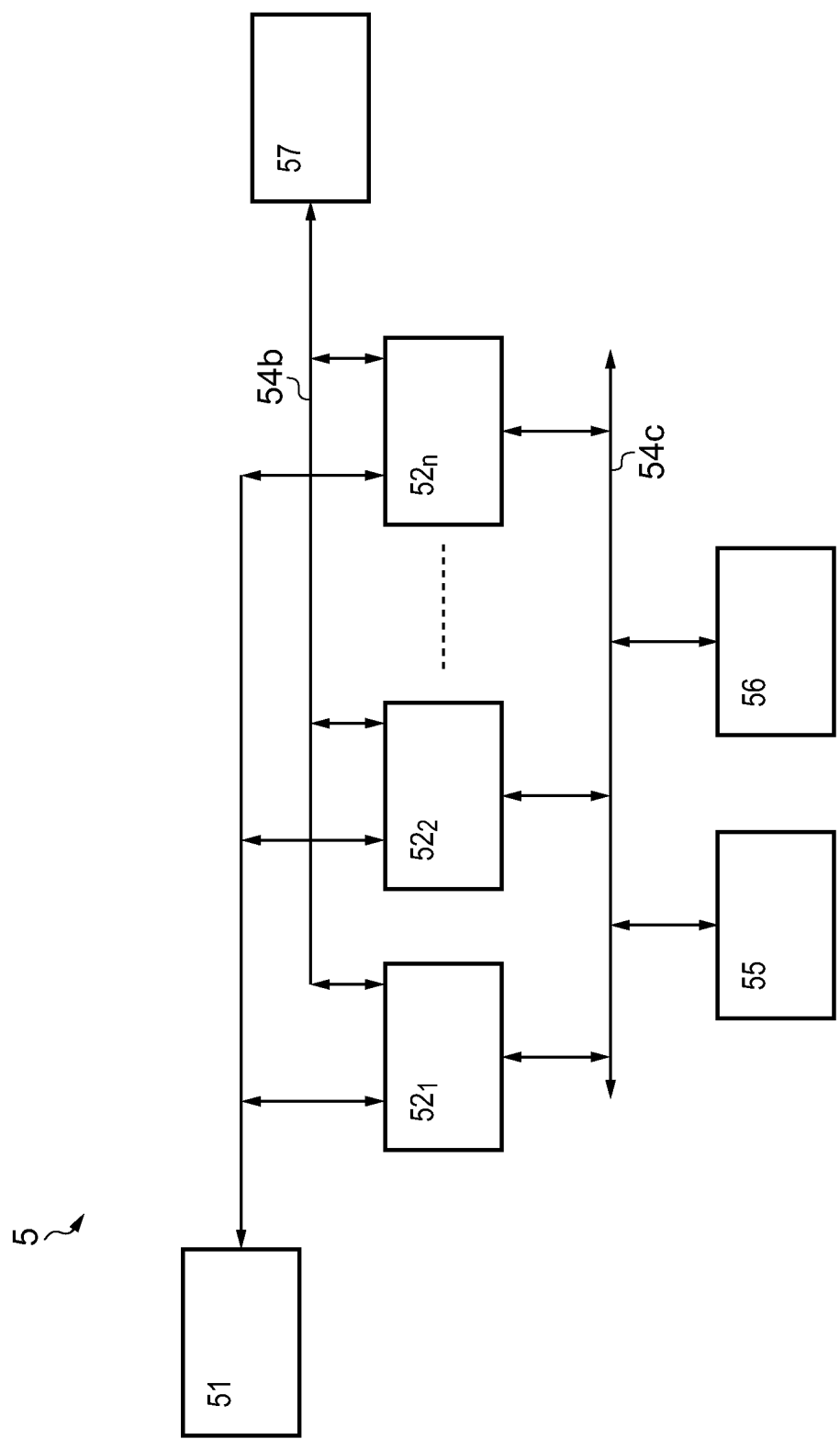
FIG. 5 illustrates a data processor embodying one aspect of the present invention.

FIG. 5 illustrates a data processor which includes a processing unit embodying one aspect of the present invention. Such a processor is suitable for processing a continual datastream, or data arranged as packets. Indeed, data within a data packet is also continual for the length of the data packet, or for part of the data packet.

The processor 5 includes a cluster of N physical processing units $52_1 \ldots 52_N$, hereafter referred to as PPUs. The PPUs $52_1 \ldots 52_N$ receive data from a first data unit 51, and sends processed data to a second data unit 57. The first and second data units 51, 57 are hardware blocks that may contain buffering or data formatting or timing functions. In the example to be described, the first data unit 51 is connected to transfer data with the radio sections of a wireless communications device, and the second data unit is connected to transfer data with the user data processing sections of the device. It will be appreciated that the first and second data units 51, 57 are suitable for transferring data to be processed by the PPUs 52 with any appropriate data source or data sink. In the present example, in a receive mode of operation, data flows from the first data unit 51, through the processor array to the second data unit 57.

In a transmit mode of operation, the data flow is in the opposite direction—that is, from the second data unit 57 to the first data unit 51 via that processing array.

The PPUs $52_1 \ldots 52_N$ are under the control of a control processor 55, and make use of a shared memory resource 56. Data and control signals are transferred between the PPUs $52_1 \ldots 52_N$, the control processor 55, and the memory resource 56 using a bus system 54c.

It can be seen that the workload of processing a data stream from source to destination is divided N ways between the PPUs $52_1 \ldots 52_N$ on the basis of time-slicing the data. Each PPU then needs only 1/Nth of the performance that a single processor would have needed. This translates into simpler hardware design, lower clock speed, and lower overall power consumption. The control processor 55 and shared memory resource 56 may be provided in the device itself, or may be provided by one or more external units.

The control processor 55 has different capabilities to the PPUs $52_1 \ldots 52_N$, since its tasks are more comparable to a general purpose processor running a body of control software. It may also be a degenerate control block with no software. It may therefore be an entirely different type of processor, as long as it can perform shared memory communications with the PPUs $52_1 \ldots 52_N$. However, the control processor 55 may be simply another instance of a PPU, or it may be of the same type but with minor modifications suited to its tasks.

It should be noted that the bandwidth of the radio data stream is usually considerably higher than the unencoded user data it represents. This means that the first data unit 51, which is at the radio end of the processing, operates at high bandwidth, and the second data unit 57 operates at a lower bandwidth related to the stream of user data.

At the radio interface, the data stream is substantially continual within a data packet. In the digital baseband processing, the data stream does not have to be continual, but the average data rate must match that of the radio frequency datastream. This means that if the baseband processing peak rate is faster than the radio data rate, the baseband processing can be executed in a non-continual, burst-like fashion. In practice however, a large difference in processing rate will require more buffering in the first and second data units 51, 57 in order to match the rates, and this is undesirable both for the cost of the data buffer storage, and the latency of data being buffered for extended periods. Therefore, baseband processing should execute as near to continually as possible, and at a rate that needs to be only slightly faster than the rate of the radio data stream, in order to allow for small temporal gaps in the processing.

Figure 6:
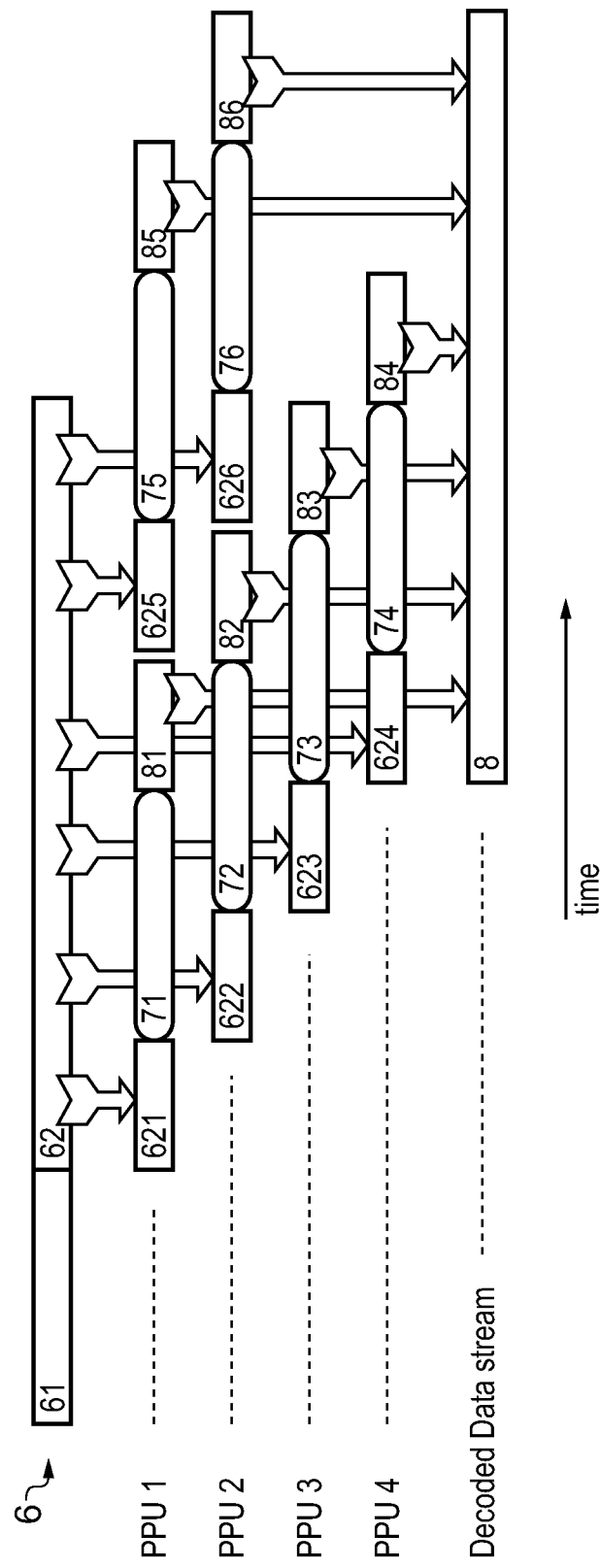
FIG. 6 illustrates data packet processing by the data processor of FIG. 5.

In the context of FIG. 5, this means that data should be near-continually streamed either to or from the radio end of the processing (to and from the first data unit 51). In a receive mode, the high bandwidth stream of near-continual data is time sliced between the PPUs $52_1 \ldots 52_N$. Consider the receiving case where high bandwidth radio sample data is being transferred from the first data unit 51 to the PPU cluster: In the simple case, a batch of radio data, being a fixed number of samples, is transferred to each PPU in turn, in round-robin sequence. This is illustrated for a received packet in FIG. 6, for the case of a cluster of four PPUs.

Each PPU $52_1 \ldots 52_N$ receives 621, 622, 623, 624, 625, and 626 a portion of the packet data 62 from the incoming data stream 6. The received data portion is then processed 71, 72, 73, 74, 75, and 76, and output 81, 82, 83, 84, 85, and 86 to form a decoded data packet 8.

Each PPU $52_1 \ldots 52_N$ must have finished processing its previous batch of samples by the time it is sent a new batch. In this way, all N PPUs $52_1 \ldots 52_N$ execute the same processing sequence, but their execution is 'out of phase' with each other, such that in combination they can accept a continuous stream of sample data.

In this simple receive case described above, each PPU $52_1 \ldots 52_N$ produces decoded output user data, at a lower bandwidth than the radio data, and supplies that data to the second data unit 57. Since the processing is uniform, the data output from all N PPUs $52_1$-$52_N$ arrives at the data sink unit 57 in the correct order, so as to produce a decoded data packet.

In a simple transmit mode case, this arrangement is simply reversed, with the PPUs $52_1 \ldots 52_N$ accepting user data from the second data unit 57 and outputting encoded sample data to the first data unit 51 for radio transmission.

The data processor includes hierarchical data networks which are designed to localize high bandwidth transactions and to maximize bandwidth with minimal data latency and power dissipation. These networks make use of an addressing scheme which is common to both the local data storage and to processor wide data storage, such as the local memory 56, in order to simplify the programming model.

However, wireless data processing is more complex than in the simple case described above. The processing will not always be uniform—it will depend on the section of the data packet being processed, and may depend on factors determined by the data packet itself. For example, the Header section of a received packet may contain information on how to process the following payload. The processing algorithms may need to be modified during reception of the packet in response to degradation of the wireless signal. On the completion of receiving a packet, an acknowledgement packet may need to be immediately transmitted in response. These and other examples of more complex processing demand that the PPUs $52_1 \ldots 52_N$ have a flexibility of scheduling and operation that is driven by the software running on them, and not just a simple pattern of operation that is fixed in hardware.

Under this more complex processing regime, the following considerations must be taken into account:

A control process, thread or agent defines the overall tasks to be performed. It may modify the priority of tasks depending on data-driven events. It may have a list of several tasks to be performed at the same time, by the available PPUs $52_1 \ldots 52_N$ of the cluster.

The data of a received packet is split into a number of sections. The lengths of the sections may vary, and some sections may be absent in some packets. Furthermore, the sections often comprise blocks of data of a fixed number of samples. These blocks of sample data are termed 'Symbols' in this description. It is highly desirable that all the data for any symbol be processed in its entirety by one PPU $52_1 \ldots 52_N$ of the cluster, since splitting a symbol between two PPUs $52_1 \ldots 52_N$ would involve undue communication between the PPUs $52_1 \ldots 52_N$ in order to process that symbol. In some cases it is also desirable that several symbols be processed together in one PPU $52_1 \ldots 52_N$, for example if the Header section 61 (FIG. 6) of the data packet comprises several symbols. The PPUs $52_1 \ldots 52_N$ must in general therefore be able to dictate how much data they receive in any given processing phase from the data source unit 51, since this quantity may need to vary throughout the processing of a packet.

Non-uniform processing conditions could potentially result in out of order processed data being available from the PPUs $52_1 \ldots 52_N$. In order to prevent such possibility, a mechanism is provided to ensure that processed data are provided to the first data unit 51 (in a transmit mode) or to the second data unit 57 (in a receive mode), in the correct order.

The processing algorithms for one section of a data packet may depend on previous sections of the data packet. This means that PPUs $52_1 \ldots 52_N$ must communicate with each other about the exact processing to be performed on subsequent data. This is in addition to, and may be a modification of, the original task specified by the control process, thread, or agent.

The combined processing power of the entire N PPUs $52_1 \ldots 52_N$ in the cluster must be at least sufficient for handling the wireless data stream in that mode that demands the greatest processing resources. In some situations, however, the data stream may require a lighter processing load, and this may result in PPUs $52_1 \ldots 52_N$ completing their processing of a data batch ahead of schedule. It is highly desirable that any PPU $52_1 \ldots 52_N$ with no immediate work load to execute be able to enter an inactive, low-power 'sleep' mode, from which it can be awoken when a workload becomes available.

The cluster arrangement provides the software with the ability for each of the PPUs $52_1 \ldots 52_N$ in the cluster to collectively decide the optimal DSP algorithms and modes in which the system should be placed in. This reduction of the collective information is available for the lower MAC layer processing via the SCN network. This localized processing and reduction hierarchy provides the MAC with the optimal level of control of the PHY DSP.

Figure 7:
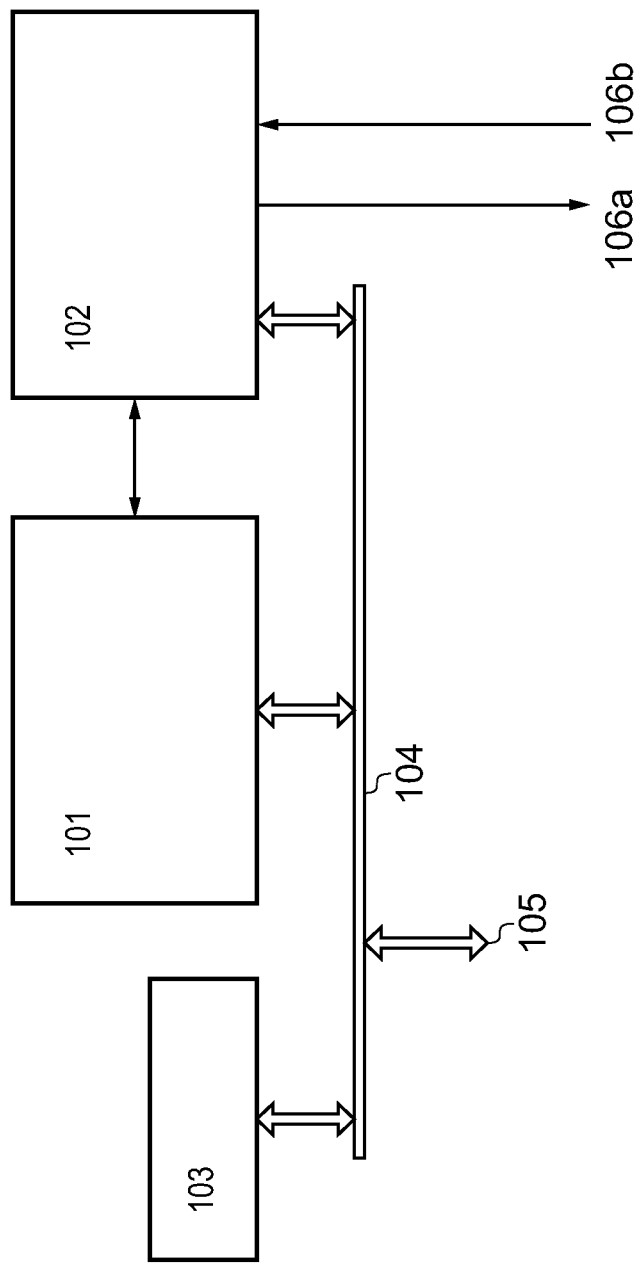
FIG. 7 illustrates a processing unit embodying one aspect of the present invention for use in the data processor of FIG. 5.

A PPU is illustrated in FIG. 7, and comprises scalar processor unit 101 (which could be a 32-bit processor) closely connected with a heterogeneous processor unit (HPU) 102. High bandwidth real time data is coupled directly into and out of the HPU 102, via a system data network (SDN) 106a and 106b (54a and 54b in FIG. 5). Scalar processor data and control data are transferred using a PPU-SMP (PPU-symmetrical multiprocessor) network PSN 104, 105 (54c in FIG. 5).

Data are substantially continually dispatched, in real time, into the HPU 102, in sequence via the SDN 106a, and are then processed. Processed data exit from the HPU 102 on the SDN 106b.

The scalar processor unit 101 operates by executing a series of instructions defined in a high level program. Embedded in this program are specific coprocessor instructions that are customized for computation within the HPU 102. The scalar unit 101 is connected in such a way that these coprocessor instructions are routed to a heterogeneous controller unit (HCU) (120 in FIG. 8) within the HPU 102, which handles control of the HPU 102.

Figure 8:
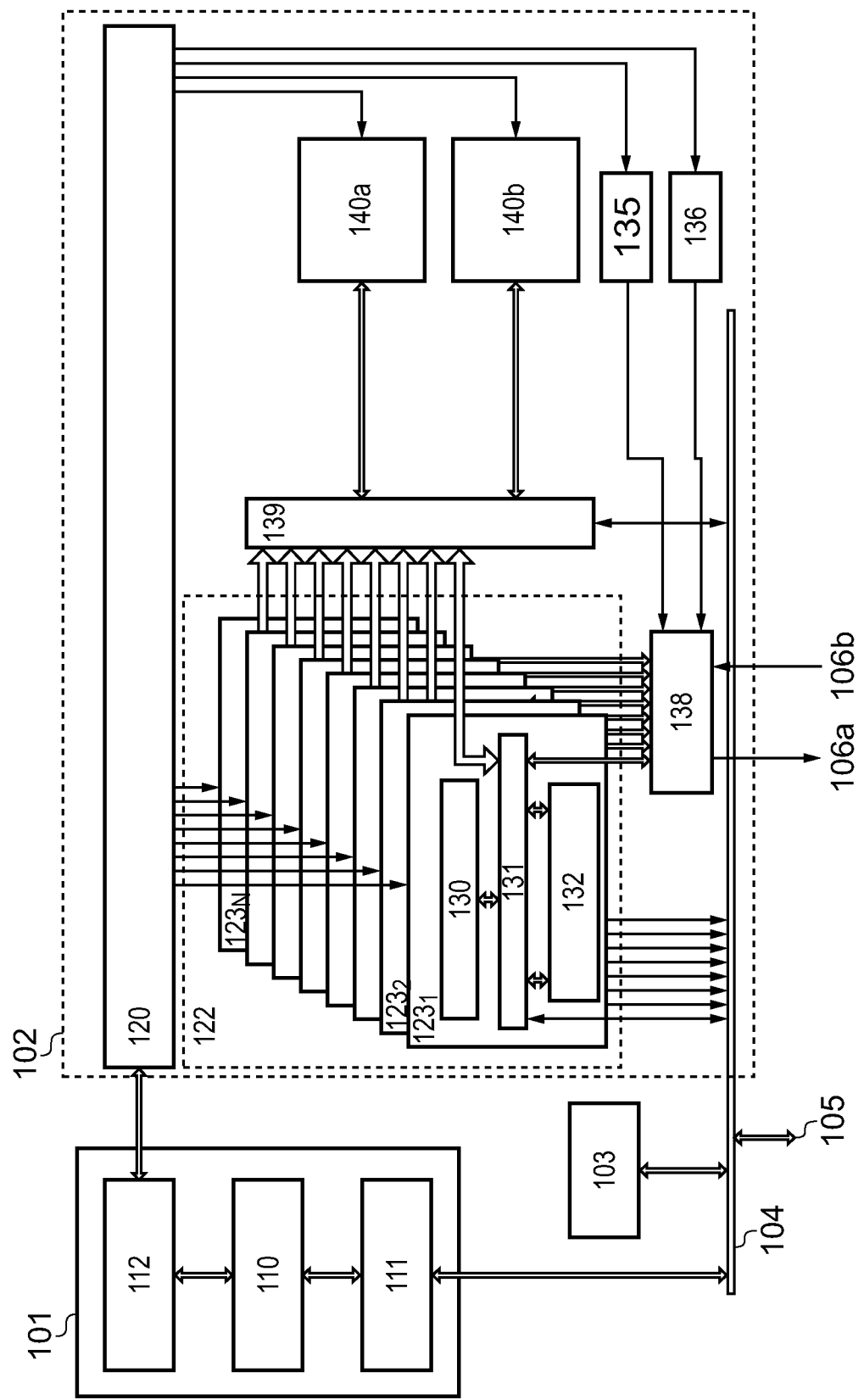
FIG. 8 illustrates the processing unit of FIG. 7 in more detail.

FIG. 8 illustrates the processing unit of FIG. 7 in more detail. The scalar processor unit 101 comprises a scalar processor 110, a data cache 111 for temporarily storing data to be transferred with the PU-SMP network 104, 105, and a co-processor interface 112 for providing interface functions to the heterogeneous processor unit 102.

The HPU 102 comprises the heterogeneous controller unit (HCU) 120 for directly controlling a number of heterogeneous function units (HFUs) and a number of connected hierarchical data networks. The total number of HFUs in the HPU 102 is scalable depending on required performance. These HFUs can be replicated, along with their controllers, within the HPU to reach any desired performance requirement.

As previously described the PPUs $52_1 \ldots 52_N$ have a need to inter communicate, in real time as the high speed data stream is received. The SU 101 in the PPU $52_1 \ldots 52_N$ is responsible for this communication, which is defined in a high level C program. This communication also requires a significant computational load as each SU 101 needs to calculate parameters that are used in the processing of the data stream. The SU 101 has DSP instructions that are used extensively for this task. These computations are executed in parallel alongside the much heavier dataflow computations in the HPU 102.

As a consequence, the SU 101 in the PPU $52_1 \ldots 52_N$ cannot service the low latency and computational burden of sequencing an instruction flow of the HPU 102. This potentially presents a requirement to add yet another SU 101 unit in the PPU $52_1 \ldots 52_N$ to provide this function at a considerable extra power and area cost. However considerable effort has been expended to provide a low cost solution and the elimination of this extra SU unit is the benefit the HCU 120 provides, without loss of functionality and programmability.

The HCU therefore represents a highly optimized implementation of the required function that an integrated control processor would provide, but without the power and area overheads.

In this way the PPU $52_1 \ldots 52_N$ can be seen as an optimized and scalable control and data plane processor for the PHY of a multi gigabit wireless technology. This combined optimization and scalability of the control and data plane separates this claim from prior art, which previously had no such control plane computational requirements.

The HPU 102 contains a programmable vector processor array (VPA) 122 which comprises a plurality of vector processor units (VPUs) 123. The number of VPUs can be scaled to reach the desired performance. Scaling VPUs 123 inside the VPA 122 does not require additional controllers.

The HPU also includes a number of fixed function Accelerator Units (AUs) 140a, 140b, and a number of memory to memory DMA (direct memory access) units 135, 136. The VPA, AUs, and DMA units provide the HFUs mentioned above. These units and their controllers can be replicated, however in the description of the following embodiment we have chosen two AU units.

Figure 9:
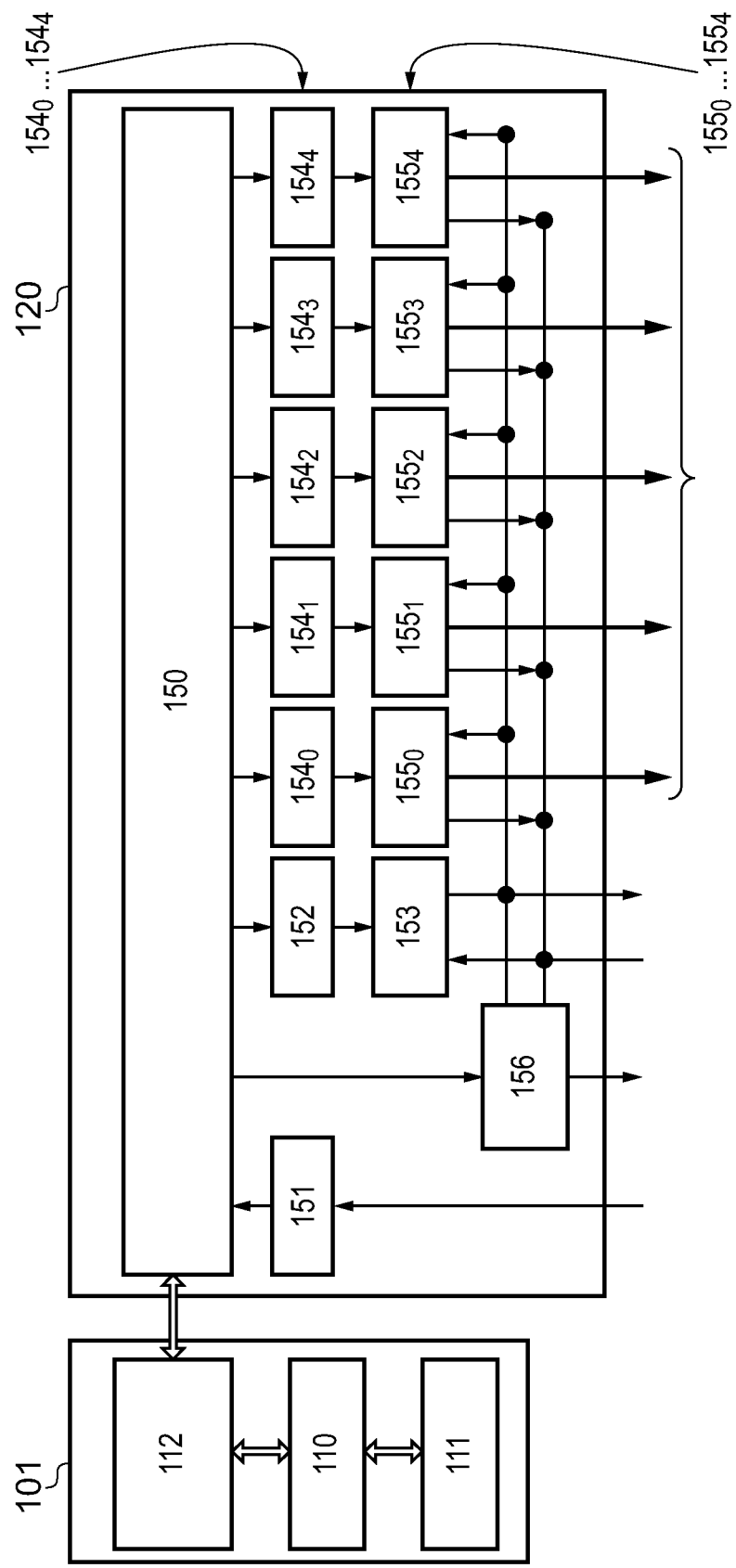
FIG. 9 illustrates a scalar processing unit and a heterogeneous controller unit of the processing unit of FIG. 8.

The HCU 120 is shown in more detail in FIG. 9, and comprises an instruction decode unit 150, which is operable to decode (at least partially) instructions and to forward them to one of a number of parallel sequencers $155_0 \ldots 155_4$, each controlling its own heterogeneous function unit (HFU). Each sequencer has storage $154_0 \ldots 154_4$ for a number of queued dispatched instructions ready for execution in a local dispatch FIFO buffer. Using a chosen selection from a number of synchronous status signals (SSS), each HFU sequencer can trigger execution of the next queued instructions stored in another HFU dispatch FIFO buffer. Once triggered, multiple instructions will be dispatched from the FIFO and sequenced until another instruction that instructs a wait on the synchronous status signals is parsed, or the FIFO runs empty.

In another embodiment, multiple dispatch FIFO buffers can be used and the choice of triggering of different synchronous status signals can be used to select which buffer is used to dispatch instructions into the respective HFU controller.

Referring back to FIG. 8, the VPA 122 comprises a plurality of vector processor units VPUs 123 arranged in a single instruction multiple data (SIMD) parallel processing architecture. Each VPU 123 comprises a vector processor element (VPE) 130 which includes a plurality of processing elements (PEs) $130_1 \ldots 130_4$. The PEs in a VPE are arranged in a SIMD within a register configuration (known as a SWAR configuration). The PEs have a high bandwidth data path interconnect function unit so that data items can be exchanged within the SWAR configuration between PEs.

Each VPE 130 is closely coupled to a VPU partitioned data memory (VPU-PDM) 132 subsystem via an optimized high bandwidth VPU network (VPUN) 131. The VPUN 131 is optimized for data movement operations into the localized VPU-PDM 132, and to various other localised networks. The VPUN 132 has allocated sufficient localized bandwidth that it can service additional networks requesting access to the VPU-PDM 132.

One other localized data network is the Accelerator Data Network (ADN) 139 which is provided in order to allow data to be transferred between the VPUs 123 and the AUs 140a, 140b. This network will service all access made to it, however it can be limited by the VPUN 132 availability. Alternatively embodiments can control access to this network using a selected synchronous status signal under program control. The programmer must ensure that unique vector addresses are used so that vector data is managed.

The VPE 130 addresses its local VPU-PDM 132 using an address scheme that is compatible with the overall hierarchical address scheme. The VPE 130 uses a vector SIMD address (VSA) to transfer data with its local VPU-PDM 132. A VSA is supplied to all of the VPUs 123 in the VPA 122, such that all of the VPUs access respective local memory with the same address. A VSA is an internal address which allows addressing of the VPU-PDM only, and does not specify which HFU or VPE is being addressed.

Adding additional address bits to the basic VSA forms a heterogeneous MIMD address (HMA). A HMA identifies a memory location in a particular heterogeneous function unit HFU within the HPU, and again is compatible with the overall system-level addressing scheme. HMAs are used to address specific memory in a specific HFU of a PPU 52.

The VSA and HMA are compatible with the overall system addressing scheme, which means that in order to address a memory location inside an HFU of a particular PPU, the system merely adds PPU-identifying bits to an HMA to produce a system-level address for accessing the memory concerned. The resulting system-level address is unique in the system-level addressing scheme, and is compatible with other system-level addresses, such as those for the local shared memory 56.

Each PPU has a unique address range within the system-level addressing scheme.

Since all the HFUs are uniquely addressable, and have access to all other HFUs and PDMs in the HPU 102, stored data items are uniquely addressable, and, therefore, can be moved amongst these units using direct memory access (DMA) controllers. Every HFU in the HPU has its own DMA controller for this purpose.

DMA units 135, 136 are provided and are arranged such that they may be programmed as the other HPUs by the HCU 120 from instructions dispatched from the SU 101 using instructions specifically targeted at each unit individually. The DMA units 135, 136 can be programmed to add the appropriate address fields so that data can automatically be moved through the hierarchies.

Since the DMA units in the HPU 102 use HMAs they can be instructed by the HCU 120 to move data between the various HFU, PDM and SDN Networks. A parallel pipeline of sequential computational tasks can then be routed seamlessly through the HFUs by executing a series of DMA instructions, followed by execution of appropriate HFU instructions. Thus, these instruction pipelines run autonomously and concurrently.

The DMA units 135, 136 are managed explicitly by the HCU 120 with respective HFU dispatch FIFO buffers (as is the case for the VPU's PDM). The DMA units 13, 136 can be integrated into specific HFUs, such as the accelerator units 140a, 140b, and can share the same dispatch FIFO buffer as that HFU.

Figure 10:
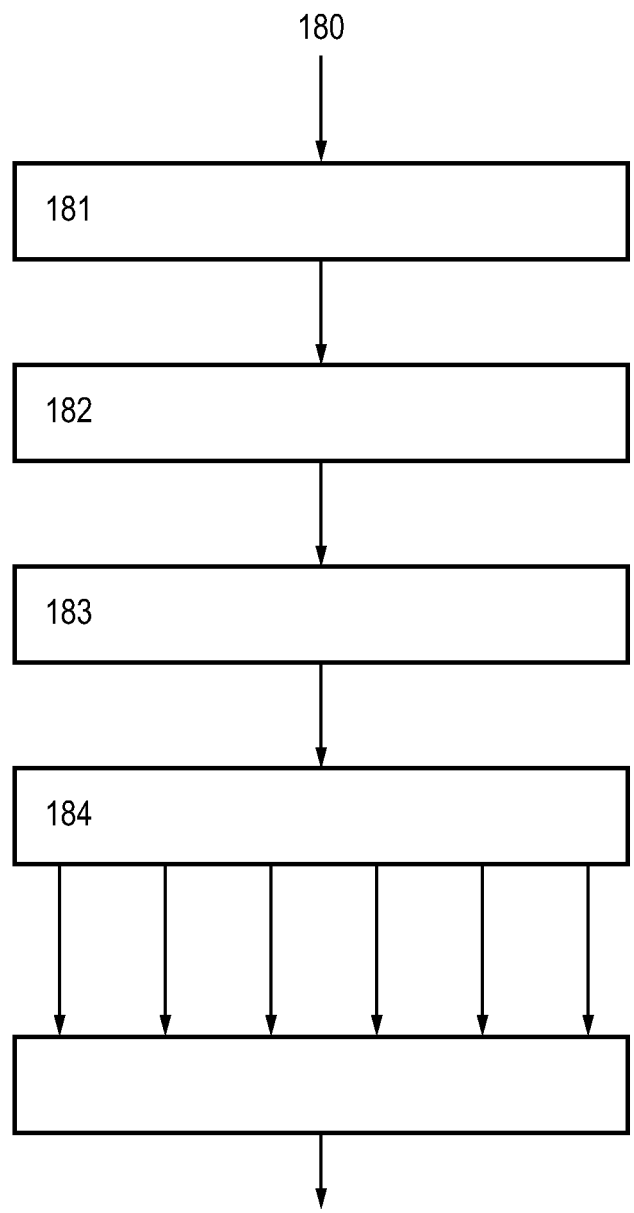
FIG. 10 illustrates a controller of the heterogeneous controller unit of FIG. 9.

Instructions are issued to the VPA 122 in the form of Very Long Instruction Word (VLIW) microinstructions by a vector micro-coded controller (VMC) within the Instruction decode unit 150 of the HCU 120. The VMC is shown in more detail in FIG. 10, and includes an instruction decoder 181, which receives instruction information 180. The instruction decoder 181 derives an instruction addresses from received instruction information, and passes those derived addresses to an instruction descriptor store 182. The instruction descriptor store 182 uses the received instruction addresses to access a store of instruction descriptors, and passes the descriptors indicated by the received instruction addresses to a code sequencer 183. The code sequencer 183 translates the instruction descriptors into microcode addresses for use by a microcode store 184. The microcode store 184 forms multi-cycle VLIW micro-sequenced instructions defined by the received microcode addresses, and outputs the completed VLIW 186 to the sequencer 155 (FIG. 9) appropriate to the HFU being instructed. The microcode store can be programmed to expand such VLIWs into a long series of repeated vectorized instructions that operate on sequences of addresses in the VPU-PDM 132. The VMC is thus able to extract significant parallel efficiency of control and thereby reduce instruction bandwidth from the PPU SU 101.

In order to ensure that instructions for a specific HFU only execute on data after the previous computation or after a DMA operation has terminated, a selection of synchronous status signals (SS Signals) are provided that are used indicate the status of execution of each HFU to other HFUs. These signals are used to start execution of an instruction that has been halted in another HFU's instruction dispatch FIFO buffer. Thus, one HFU can be caused to await the end of processing of an instruction in another HFU before commencing its own instruction dispatch and processing.

The selection of which synchronous status to use is under program control, and the status is passed as one of the parameters with the instruction for the specific HFU. In each HFU controller, all the synchronous status signals are input into a selectable multiplexer unit to provide a single internal control to the HFU sequencers. Similarly, the sequencer outputs an internal signal, which is selected to drive one of the selected synchronous status signals. These selections are part of the HPU program.

This allows many instructions to be dispatched into HFU dispatch FIFO buffers ahead of the execution of that instruction. This guarantees that each stage of processing will wait until the data is ready for that HFU. Since the vector instructions in the HFUs can last many cycles, it is likely that the instruction dispatch time will be very short compared to the actual execution time. Since many instructions can wait in each HFU dispatch FIFO buffer, the HFUs can optimally execute concurrently without the need for interaction with the SU 101 or any other HFU, once instruction dispatch has been triggered.

A group of synchronous status signals are connected into the SU 101 both via interrupt mechanisms via an HPU Status (HPU-STA) 151 or via External Synchronous Signals 153. This provides synchronisation with SU 101 processes and the HFUs. These are collectively known as SU-SS signals.

Another group of synchronous status signals are connected to the SDN Network and PSN network interfaces. This provides synchronisation across the SoC such that system wide DMAs can be made synchronous with the HPU. This is controlled in controller HFC 153.

Another group of Synchronous Status Signals are connected to programmable timer hardware 153, both local and global to the SoC. This provides a method for accurately timing the start of a processing task and control of DMA of data around the SoC.

Some of the synchronous status signals can be programmed to map onto to the HPU power saving controls (HPU-PSC) 156. These signals are selectively routed to the root clock enable gating clock tree networks of entire HFUs in the HPU such as some or all the VPUs and selectable AUs. These synchronous status signals can be used to switch on and off the clocks to the logic in these units, saving considerable power used in the clock distribution networks.

Alternatively in other power saving modes, these power saving controls are used to control large MTCMOS transistors that are placed in the power supplies of the HFUs. This can turn of power to regions of logic, this can save more power, including any leakage power.

A combination of FFT Accelerator Units, LDPC Accelerator Units and Vector Processor Units are used to offload optimally different sequential stages of computation of an algorithm to the appropriate optimized HFU. Thus the HFU's that constitute the HPU 102 operate automatically and optimally on data in a strict sequential manner described by a software program created using conventional software tools.

The status of the HPU 102 can also be read back using instructions issued through the co-processor interface (CPI) 112. Depending on which instructions are used, various status conditions can be returned to the SU 101 to direct the program flow of the SU 101.

Figure 11B:
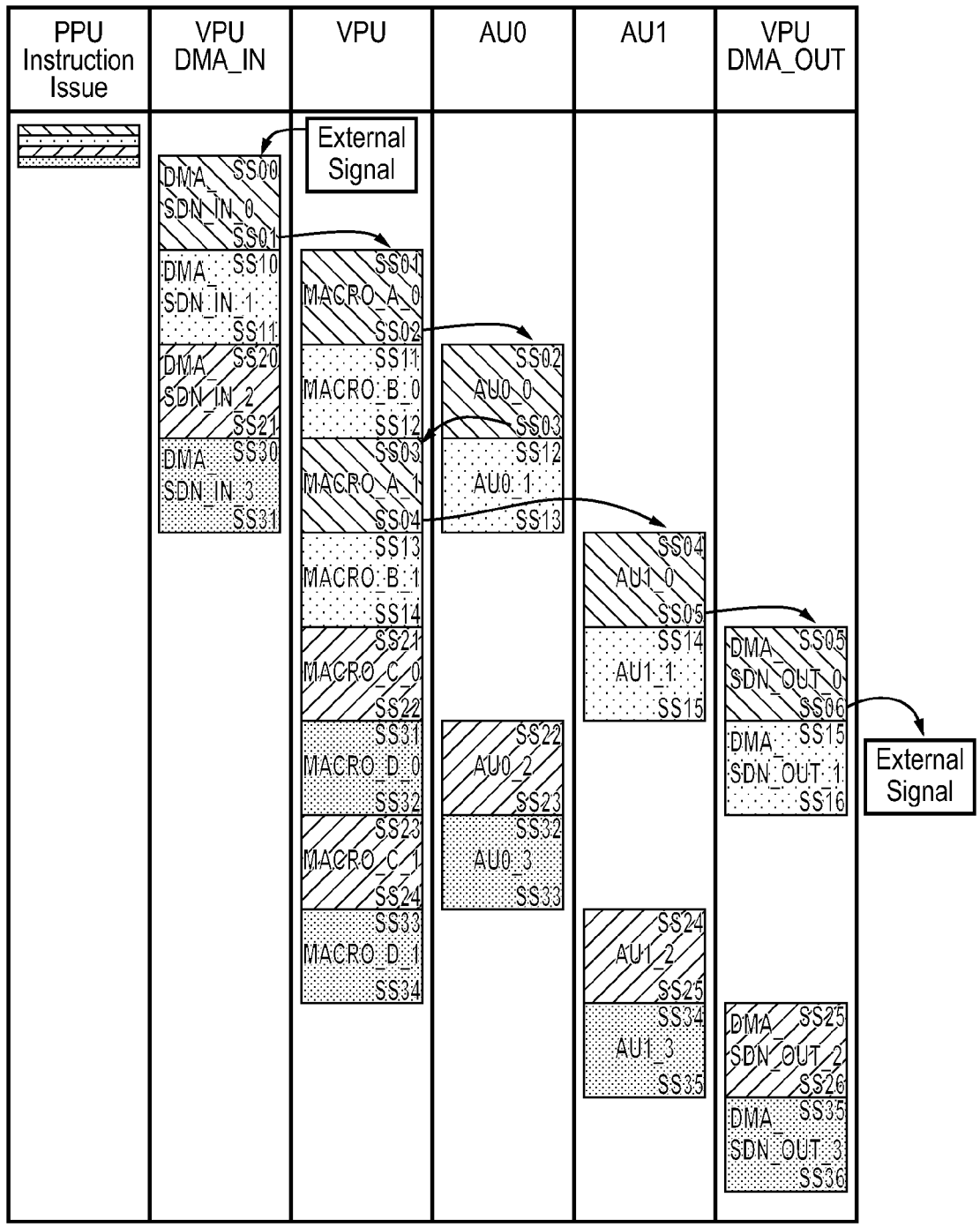

An example illustration of the HPU 102 in operation is shown in FIG. 11B. A typical heterogeneous computation and dataflow operation is shown. The time axis is shown vertically, each block of activity is a vector slot operation which can operate over many 10s or 100s of cycles. HFU units 122, 140a, 140b, 135, 136 status of activity are shown horizontally.

Also illustrated is the subsequent chaining of vector operations, using parallel execution units, utilising the program defined selected synchronous status signals. Each box is named by the reference to the series of instructions in the program in FIG. 11A. In the diagram has the entry synchronous status signal and exit synchronous status signal labelled in the top and bottom right.

The example also illustrates the automated vectored data flow and synchronisation of HFU 122, 140, 135, 136 unit to HFU unit, within the HPU 102, controlled by the program in FIG. 11A. The black arrows indicate the triggering order of the synchronous status signals and hence the control of the flow of data through the HFUs.

The program shown in FIG. 11A, is assembled into a series of instructions, along with addresses and assigned status signals as a contiguous block of data, using development tools during program development.

Once the program is dispatched into the HCU 120, from the SU 101 via the co-processor port, using a block memory operation, the HPU 102 processing is therefore separate and distinct from the SU's 101 own instruction stream. Once dispatched, this frees the SU 101 to proceed without need to service the HPU. This may be many thousands of cycles, which can be used to calculate outer loop parameters such as constants used in equalisation and filtering.

The SU 101 cannot play a part in the subsequent HPU 102 vector execution and dataflow because the rate of dataflow into the HPU 102 from the wider SoC is so high. The SU 101 performance, bandwidths and response latencies are dwarfed by the HPU 102 computational operations, bandwidths and low latency of chained dataflow.

Consequently the performance of the HPU 102 is matched with replications of VPEs 123 in the VPA 122 and high performance throughput and replication of the accelerator units 122, 140a, 140b, 135, 136.

Once instructions are dispatched into the HFC 150, by the SU 101, the HFC decodes instructions fields and loads the instructions into the selected HFU 122, 140a 140b, 135, 136 unit FIFOs $154_0 \ldots 154_4$, using a pre-defined bit fields. This loading is illustrated by the first block top left of FIG. 11B. An entire HPU 102 program is thus dispatched into the HFU Dispatch FIFOs $154_0 \ldots 154_4$ before completion or even start of execution in the HPU 102.

In the example, the first operation VPU_DMA_SDN_IN_0 is triggered by an external signal connected to synchronous status signal SS0. This starts a DMA sequencer that streams data into the HMA address Buff_Addr_00 from the system wide SoC vector address SoC_Addr_00. This targets addresses in the VPU-PDM 132 memories. Upon completion the sequencer triggers synchronous status signal SS1.

The triggering of synchronous status signal SS1 is monitored by the VPA 122 dispatch fifo sequencer $155_0$ which releases instructions held in the VPA dispatch fifo $154_0$. This fifo contains VPU_MACRO_A_0, a sequence of one or more vector instructions that are sequenced into the VPA 122 VMC controller. Hence instructions are executed on the data stored in each of the VPU-PDM 132 memories, in parallel. The resultant processed data is stored at Buff_Addr_01 in the VPU-PDM 132.

Concurrently with the VPU 122 execution, synchronous status signal SS10 triggers more data streaming from SoC_Addr_10 into the VPU-SDM 132 at address Buff_Addr_10.

Once VPU_MACRO_A_0 finishes, it triggers synchronous status signal SS02, this in turn is monitored by AU0 140a fifo sequencer and releases waiting instructions and addresses in the HFU 140a fifo. Data is streamed from VPU-PDM 132 address Buff_Addr_01 through AU0 140a and back into VPU-PDM 132 at address Buff_Addr_02. Upon termination of this sequence, synchronous status signal SS03 is triggered. This autonomous chained sequence is illustrated by the black arrows in FIG. 11B.

Thus data flows through the HPU 102 function units under the control of the HPU 102 program using the HCU 120 Synchronous State signals and using the VPU 122 HMA addresses defined in the program. Eventually data is streamed out of the HPU 102 with the VPU_DMA_SDN_OUT instruction to a SoC address defined by SoC_Addr_01 using synchronous state signal SS06.

These sequences then continue as defined in the rest of the program defined in FIG. 11A.

The example shows four phases of similar overlapped dataflow operations. The order of execution is chosen to maximize the utilization of the VPU 122, as shown by the third column labelled VPU having no pauses in execution as data flows through the HPU 102.

At various phases during execution shown in this example, multiple HFU 122, 140a, 140b, 135, 136 units are shown to run concurrently, autonomously without interaction with SU 101, optimally by minimising latency between one HFU operation completing and another starting and moving data within buss hierarchies of the HPU 102. For example, of the 11 HFU vector execution time slots shown in FIG. 11b, 5 slots have three HFU units running concurrently, and 4 slots have 2 concurrent units running.

Also data flow entering and exiting the HPU 102 is synchronized to external input and output units (not shown) in the wider SoC. If these synchronous signals are delayed or paused the chain of HFU vector processing within the HPU 102 automatically follows in response.

The invention claimed is:

1. A data processing unit comprising:
    a scalar processor device; and
    a heterogeneous processor device connected to receive instruction information from the scalar processor, and to receive incoming data packets, and operable to process incoming data packets in accordance with received instruction information,
  wherein the heterogeneous processor device comprises:
    a heterogeneous controller unit connected to receive instruction information from the scalar processor, and operable to output instruction information;
    a plurality of instruction sequencers connected to receive instruction information from the heterogeneous controller unit, and operable to output respective sequences of instructions; and
    a plurality of heterogeneous function units, including:
      a vector processor array including a plurality of vector processor elements operable to process received data items in accordance with instructions received from the plurality of instruction sequencers;
      a low-density parity-code (LDPC) accelerator unit connected to receive data items from the vector processor array, and operable, under control of the heterogeneous controller unit, to process such received data items and to transmit processed data items to the vector processor array; and
      a fast Fourier transform (FFT) accelerator unit connected to receive data items from the vector processor array, and operable, under control of the heterogeneous controller unit, to process such received data items and to transmit processed data items to the vector processor array,
  wherein the heterogeneous controller unit is operable to receive synchronous state signals from the heterogeneous function units, and to control power saving modes of the heterogeneous function units in dependence upon received synchronous state signals.

2. The data processing unit as claimed in claim 1, wherein the heterogeneous controller unit is operable to cause a heterogeneous function unit to enter a low power mode.

3. The data processing unit as claimed in claim 1, wherein the heterogeneous controller unit is operable to cause a heterogeneous function unit to exit a low power mode.

4. The data processing unit as claimed in claim 1, wherein the heterogeneous controller unit is operable to control operating parameters of a low power mode of a heterogeneous function unit to enter a low power mode.

5. The data processing unit as claimed in claim 1, wherein the heterogeneous controller unit is operable to control a clock enable signal of a heterogeneous function unit.

6. The data processing unit as claimed in claim 1, wherein the heterogeneous controller unit is operable to modify a supply voltage of a heterogeneous function unit.

7. The data processing unit as claimed in claim 1, wherein the heterogeneous controller unit is operable to modify data storage behavior of a heterogeneous function unit.

8. The data processing unit as claimed in claim 1, further comprising a programmable timer unit which is operable to provide timing information for a start of a processing task.

9. The data processing unit as claimed in claim 1, further comprising a data packet processing system.

10. The data processing unit as claimed in claim 1, further comprising a wireless communications device comprising an RF transceiver and operable to transfer data packets with the RF transceiver.

\* \* \* \* \*

UNITED STATES PATENT AND TRADEMARK OFFICE
CERTIFICATE OF CORRECTION

PATENT NO. : 9,285,793 B2  
APPLICATION NO. : 13/880473  
DATED : March 15, 2016  
INVENTOR(S) : Ray McConnell et al.

Page 1 of 1

It is certified that error appears in the above-identified patent and that said Letters Patent is hereby corrected as shown below:

ON THE TITLE PAGE

Item (73) Assignee should read: BLUWIRELESS TECHNOLOGY LIMITED, Bristol (GB)

Signed and Sealed this  
Seventeenth Day of May, 2016

Michelle K. Lee  
*Director of the United States Patent and Trademark Office*